(12) United States Patent
Sennett et al.

(10) Patent No.: US 8,462,017 B2
(45) Date of Patent: *Jun. 11, 2013

(54) DEVICES AND METHODS FOR CONTROLLING A CHANGE OF STATUS OF TRAFFIC LIGHT AT A CROSSWALK

(75) Inventors: DeWayne Sennett, Redmond, WA (US); Brian Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,119

(22) Filed: Sep. 5, 2012

(65) Prior Publication Data

US 2012/0326892 A1    Dec. 27, 2012

Related U.S. Application Data

(63) Continuation of application No. 12/637,155, filed on Dec. 14, 2009, now Pat. No. 8,274,404.

(51) Int. Cl.
*G08G 1/07* (2006.01)

(52) U.S. Cl.
USPC ............. 340/925; 340/4.1; 340/906; 340/944

(58) Field of Classification Search
USPC ................... 340/944, 906, 925, 4.1; 434/112
See application file for complete search history.

(56) References Cited

U.S. PATENT DOCUMENTS

| 4,025,922 | A | 5/1977 | Trawick, III |
| 4,253,083 | A | 2/1981 | Imamura |
| 7,230,538 | B2 | 6/2007 | Lai et al. |
| 7,486,204 | B2 | 2/2009 | Quintos |
| 8,274,404 | B2 * | 9/2012 | Sennett et al. ............... 340/944 |
| 2005/0192746 | A1 | 9/2005 | King et al. |
| 2007/0005245 | A1 | 1/2007 | Ellis |
| 2008/0018494 | A1 | 1/2008 | Waite et al. |
| 2008/0316055 | A1 | 12/2008 | Bachelder et al. |

* cited by examiner

*Primary Examiner* — Brent Swarthout
(74) *Attorney, Agent, or Firm* — Parks IP Law LLC; Jennifer P. Medlin, Esq.

(57) ABSTRACT

The change of the status of a traffic light at a crosswalk is controlled based on an impaired individual's location with respect to the crosswalk. An appropriate alert indicating the status of the traffic light is determined based at least on the location of the impaired individual. The type of impairment may also be used in determining the appropriate alert. The appropriate alert is generated to inform the impaired individual of the status of the traffic light.

20 Claims, 4 Drawing Sheets

DEVICES AND METHODS FOR CONTROLLING A CHANGE OF STATUS OF TRAFFIC LIGHT AT A CROSSWALK

CROSS REFERENCE TO RELATED APPLICATION

This application is a continuation of U.S. application Ser. No. 12/637,155, filed Dec. 14, 2009 (now issued as U.S. Pat. No. 8,274,404), the entirety of which is incorporated herein by reference.

TECHNICAL FIELD

The present disclosure relates generally to devices and methods for controlling traffic lights, and more particularly, to devices and methods for controlling a change of a traffic light at a crosswalk.

BACKGROUND

Individuals who have mobility limitations (e.g., individuals in wheelchairs), vision limitations (e.g., blind individuals), and/or auditory limitations (e.g., deaf individuals) may be at risk if they are still a crosswalk when the traffic lights change. This situation may be especially risky for these individuals as they are crossing several lanes with large amounts of traffic. This can be even more dangerous with hybrid vehicles that are difficult to hear when running on battery power at a traffic light.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to an exemplary embodiment, a traffic light controller controls change of a status of a traffic light at a crosswalk. The traffic light controller includes a transceiver for receiving at least one signal indicating a location of an impaired individual with respect to the crosswalk and a processor for controlling change of the status of the traffic light based on the signal. The processor also determines an appropriate alert indicating the status of the traffic light based at least on the location of the impaired individual with respect to the crosswalk. The transceiver transmits a signal indicating the appropriate alert.

According to another exemplary embodiment, a wireless device communicates with a traffic light controller at a crosswalk. The wireless device includes a transmitter for transmitting at least one signal indicating a location of an impaired individual with respect to the crosswalk to the traffic light controller. The transmitted signal is used to control a change of a status of the traffic light based on the location of the impaired individual. The wireless device also includes a receiver for receiving a signal indicating an appropriate alert based on the location of the location of impaired individual with respect to the crosswalk and a processor for generating the appropriate alert based on the received signal.

According to another exemplary embodiment, a method for controlling change of a status of a traffic light at a crosswalk includes receiving at least one signal indicating a location of an impaired individual with respect to the crosswalk and controlling, via a processor, a change of the status of the traffic light based at least one the received signal. The method further includes determining an appropriate alert indicating the status of the traffic light based on at least on the location of the impaired individual with respect to the crosswalk and transmitting a signal indicating the appropriate alert based at least on the location of the impaired individual with respect to the crosswalk.

DETAILED DESCRIPTION

Detailed exemplary embodiments are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
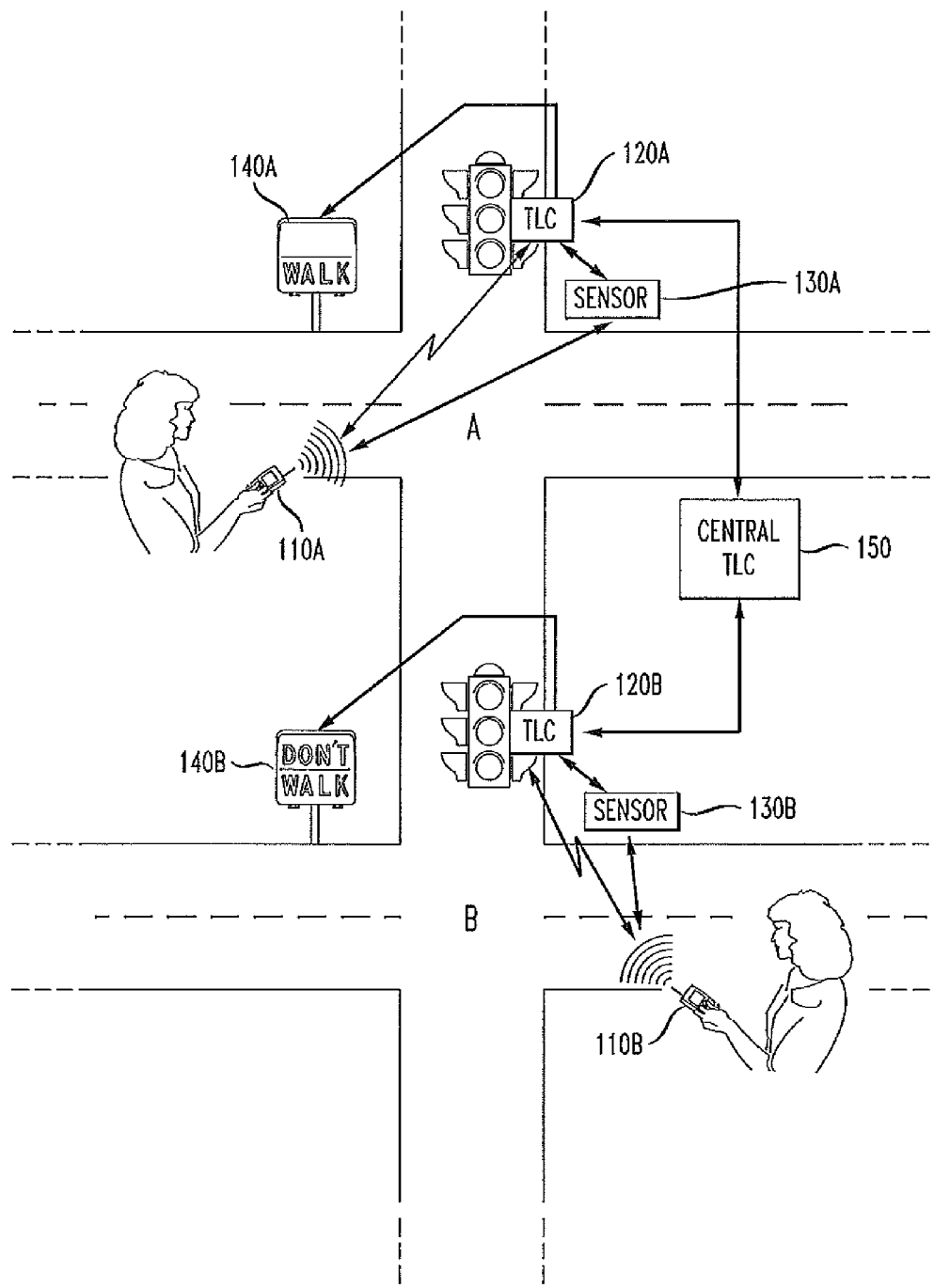
FIG. 1 illustrates an environment in which a traffic light controller and a wireless device may be implemented according to an exemplary embodiment.

FIG. 1 illustrates an environment in which a traffic light controller and a wireless device may be implemented according to an exemplary embodiment. Referring to FIG. 1, the location of one or more wireless devices 110A, 110B with respect to one or more crosswalks A, B is determined and reported to one or more traffic light controllers 120A, 120B. The traffic light controllers 120A, 120B may be integrated as part of or communicatively coupled to lights in crosswalks A, B, respectively.

In some embodiments, each of the devices 110A, 110B determines its location with respect to the crosswalk it nearest and communicates the determined location to the respective traffic light controller 120A, 120B. In some embodiments, one or more of the devices 110A, 110B can determine its location using GPS or other location services, for example, and communicate location information to the traffic light controllers 120A, 120B upon determination of the location information, at various times or location intervals, or upon receipt of a location request from the traffic light controller or one or more external networks, users, programs and/or applications, combinations thereof, and the like. The location of the devices 110A, 110B may also be determined using RFID signals emitted from the devices 110A, 110B, detected by sensors 130A, 130B adjacent the crosswalks A and B, respectively, and reported to the traffic light controllers 120A, 120B.

In another embodiment, the locations of the devices 110A, 110B may be determined by triangulation of signals emitted by the devices 110A, 110B and detected by the sensors 130A, 130B, measuring signal strengths of signals emitted by the devices 110A, 110B by the sensors 130A, 130B, measuring the time difference of arrival (TDOA) of signals from the devices 110A, 110B at, e.g., the sensors 130A, 130B and/or by sensing proximity of for example, the devices 110A, 110B to stripes or markings on curbs of the crosswalks A, B using directional antennas for detecting signals emitted by the devices 110A, 110B. The directional antennas may be incorporated within the sensors 130A, 130B. In each of these scenarios, detected signals are reported to the respective traffic light controllers 120A, 120B.

As shown in FIG. 1, the sensors 130A, 130B may be situated at various locations with respect to the crosswalks A, B respectively. Although only two sensors are shown for ease of illustration, it should be appreciated that any number of sensors may be use. Alternatively or additionally, one or more sensors or other elements for determining locations of the wireless devices 110A, 110B may be included in the traffic light controllers 120A, 120B.

Further, it should be appreciated that, although only two wireless devices, two traffic light controllers, two alert indicators and two crosswalks are illustrated for simplicity of illustration, this disclosure may be applicable to any number of devices, traffic light controllers and crosswalks.

Based on the locations of the wireless devices 110A, 110B with respect to the crosswalks A, B the traffic light controllers 120A, 120B control a change of the status of the traffic lights and provide information for generating an alert indicating a status of the traffic light to the impaired individual. This information may be provided to the wireless devices 110A, 110B, which, in turn, generate appropriate alerts. Alternatively or in addition, this information may be provided to alert indicators 140A, 140B adjacent the crosswalks A, B.

There may be different types of visual, audible, and/or tactile alerts provided to accommodate different impairments. For visually impaired individuals, audible and/or tactile alerts may be provided. For hearing-impaired individuals, visual and/or tactile alerts may be provided. For mobility impaired individuals, one or more of visual, audible, and tactile alerts may be provided.

Examples of alerts that may be provided are a visual "Walk//Don't Walk/Hurry" alarm that may be provided by the alert indicators and or the wireless devices 110A, 110B to individuals having auditory and/or mobility impairments. These alerts may indicate the number of seconds left before a light is scheduled to change. For the visually impaired, these alerts may be provided audibly by the alert indicators 140A, 140B and/or the wireless devices 110A, 110B. In this scenario, the volume of the alert may be varied depending on how much time the impaired individual has to clear the crosswalk before the light changes. Another alert that may be provided is a tactile alert, e.g., a vibration provided by the wireless devices 110A, 110B responsive to signals from the traffic light controllers 120A, 120B. The tactile vibrations may vary depending whether it is OK for the impaired individual to proceed through the crosswalk or whether the individual should hurry to clear or not start to proceed through the crosswalk.

According to an exemplary embodiment, if one or more impaired individuals are still in the crosswalk when it is time for the traffic light controller 120A, 120B to change the status of the traffic light, the traffic light controller 120A, 120B may postpone changing the status of the traffic light for the safety of these individuals. The traffic light controller 120A, 120B may postpone change of the status of a traffic light by a predetermined amount of time, based on signals indicating a location of the individual with proximity to the curb, and/or pace of the individual.

According to an exemplary embodiment, if an impaired individual is approaching a crosswalk and it is not safe for the individual to cross the crosswalk, the traffic light controller 120A, 120B may provide this information to the individual via the wireless device 110A, 110B and/or the alert indicator 140A, 140B. For example, this information may indicate that there is not enough time to cross the street before the light changes or the traffic flow is currently across the crosswalk. This may be especially useful for the vision impaired who are not able to see the visual "Walk/Don't Walk" indicators. The alert may indicate that the impaired individual should not enter the crosswalk or should proceed as fast as possible through the crosswalk. The alert may vary depending on whether the individual is already in the crosswalk.

According to one embodiment, the person may be verified as an impaired individual, to avoid abuse. RFID tags may be used for this purpose. For example, impaired individuals that commonly use the crosswalks may be investigated and tracked. There may be an authentication/authorization process (e.g., a PIN, a biological identification associated with each individual, such as an iris scan or fingerprint reading) to verify the individual. This authentication may be sensed, e.g., by the wireless device. Also, the devices 110A, 110B may be registered, and an impaired individual may provide an alert or the wireless devices 110A, 110B may automatically generate alert if the devices are lost or stolen and use is attempted by an unauthorized individual. These reports may be provided to, e.g., a city traffic engineering department, local law enforcement, a wireless service provider, etc.

According to one embodiment, a traffic light controller 120A, 120B may cause lights to change based on a pace of an impaired individual. For example, the traffic light controller 120A, 120B may adjust the time period for changing the traffic light based on the pace of the impaired individual in progressing through a crosswalk, or the traffic light controller may hold changing of the traffic light until the impaired individual has cleared the crosswalk.

According to another embodiment, an indication of traffic flow may be provided to a user attempting to cross a crosswalk. For example, if there is gridlock, and a crosswalk is blocked, the user may be alerted visually, audibly, and/or tactilely as appropriate. The traffic light controller 120A, 120B may also provide information regarding oncoming traffic, e.g., the speed and/or volume of oncoming traffic. This may be implemented with the aid of sensors placed within, e.g., 30-50 feet of the traffic controller {not shown for ease of illustration}.

A hierarchy may be put into place to resolve conflicts between various signals detected regarding the location of an impaired individual, a status of the crosswalk system, and oncoming traffic monitors. For example, depending on a person's impairment, the person may be given a certain priority with regard to whether or not an alert is provided and/or what kind of alert is provided. This may be based on identification/authentication/authorization of the individual. For example, if the individual is identified as being confined to a wheelchair, that individual may be given first priority in terms of crossing the crosswalk. Or, a blind person may be given first priority. The alert provided to the individual may vary based on a priority associated with the individual.

Data collected by the sensors 130A, 130B and by various traffic light controllers 120A, 120B may be transmitted to a central traffic controller 150. This data may be used in traffic planning. Usage patterns may be created based on collected data. For example, depending on the number of impaired individuals using a particular crosswalk at a given time, buses and emergency vehicles may be rerouted such that they do not encounter that crosswalk. The lights may also be held longer in advance of the crosswalk through which the impaired individuals are progressing. Although not illustrated or described in detail, it should be appreciated that the central traffic controller 150 may include components, such as an interface for communicating with the traffic light controllers, a memory for storing applications for traffic planning, and a processor for executing the applications for traffic planning.

Figure 2:
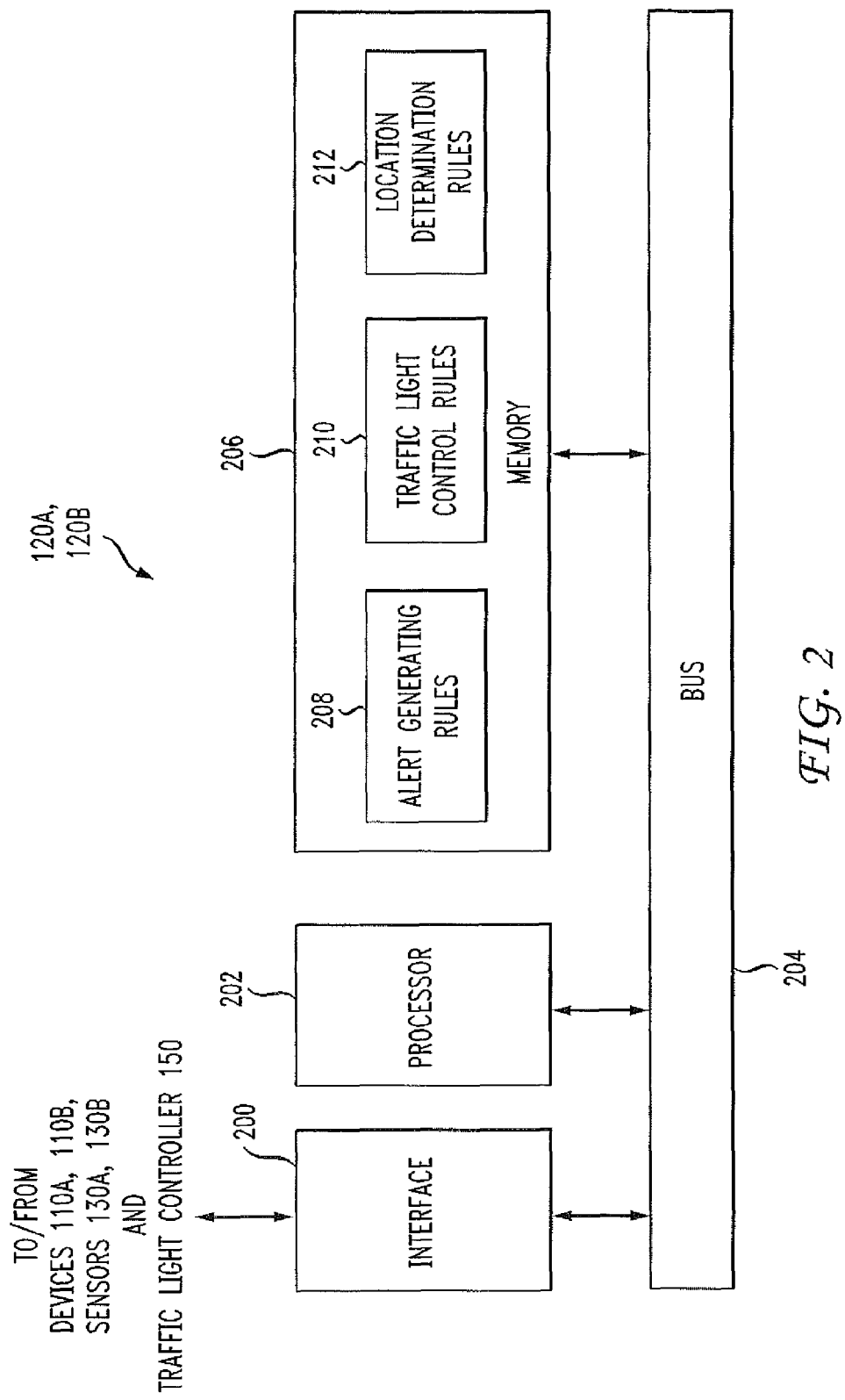
FIG. 2 illustrates a traffic light controller in detail according to an exemplary embodiment.

FIG. 2 illustrates a block diagram of a traffic light controller, such as the traffic light controllers 120A, 120B shown in FIG. 1, according to an exemplary embodiment. The traffic light controllers 120A, 120B can each include a combination of hardware and software and can exist as a node on a network, such as a GPS network. The illustrated traffic light controllers 120A, 120B each include one or more network interfaces 200 that are operatively linked and in communication with one or more processors 202 via one or more data/memory busses 204. The network interface 200 can be used to allow the traffic light controllers 120a, 120b to communicate with one or more components of the system, e.g., the wireless devices 110A, 110B, the sensors 130A, 130B, or any device connected thereto or residing thereon. The processor 202 is operatively linked and in communication with a memory 206 via the data/memory bus 204.

The word "memory," as used herein to describe the memory, collectively includes all memory types associated with the traffic controller such as, but not limited to, processor registers, processor cache, random access memory (RAM), other volatile memory forms, and non-volatile, semi-permanent or permanent memory types; for example, tape-based media, optical media, solid state media, hard disks, combinations thereof, and the like. While the memory 206 is illustrated as residing proximate the processor 202, it should be understood that the memory 206 can be a remotely accessed storage system, for example, a server on a communication network, a remote hard disk drive, a removable storage medium, combinations thereof, and the like. Moreover, the memory 206 is intended to encompass network memory and/or other storage devices in wired or wireless communication with the traffic light controllers 120A, 120B which may utilize the network interface 206 to facilitate such communication. Thus, any of the rules, data, applications, and/or software described below can be stored within the memory 206 and/or accessed via network connections to other data processing systems (not shown) that may include a local area network (LAN), a metropolitan area network (MAN), or a wide area network (WAN), for example. Accordingly, the present disclosure may operate on the traffic light controller, wherein the traffic light controller is configured as a server to one or more client data processing systems as dictated by a client/server model. It should be appreciated that the memory 206 can also be a storage device associated with the traffic light controller 120A, 120B. The illustrated memory 206 can include one or more alert generating rules 208 for generating appropriate alerts as described above, traffic light control rules 210 for controlling status of a traffic light as described above, and location determination rules 212 for determining location of an impaired individual with respect to a crosswalk as described above.

It is contemplated that the traffic light controllers 120A, 120B can be configured to store applications to perform steps of the methods described herein below. Applications can include, for example, programs, routines, subroutines, algorithms, software, tools, and the like.

Figure 3:
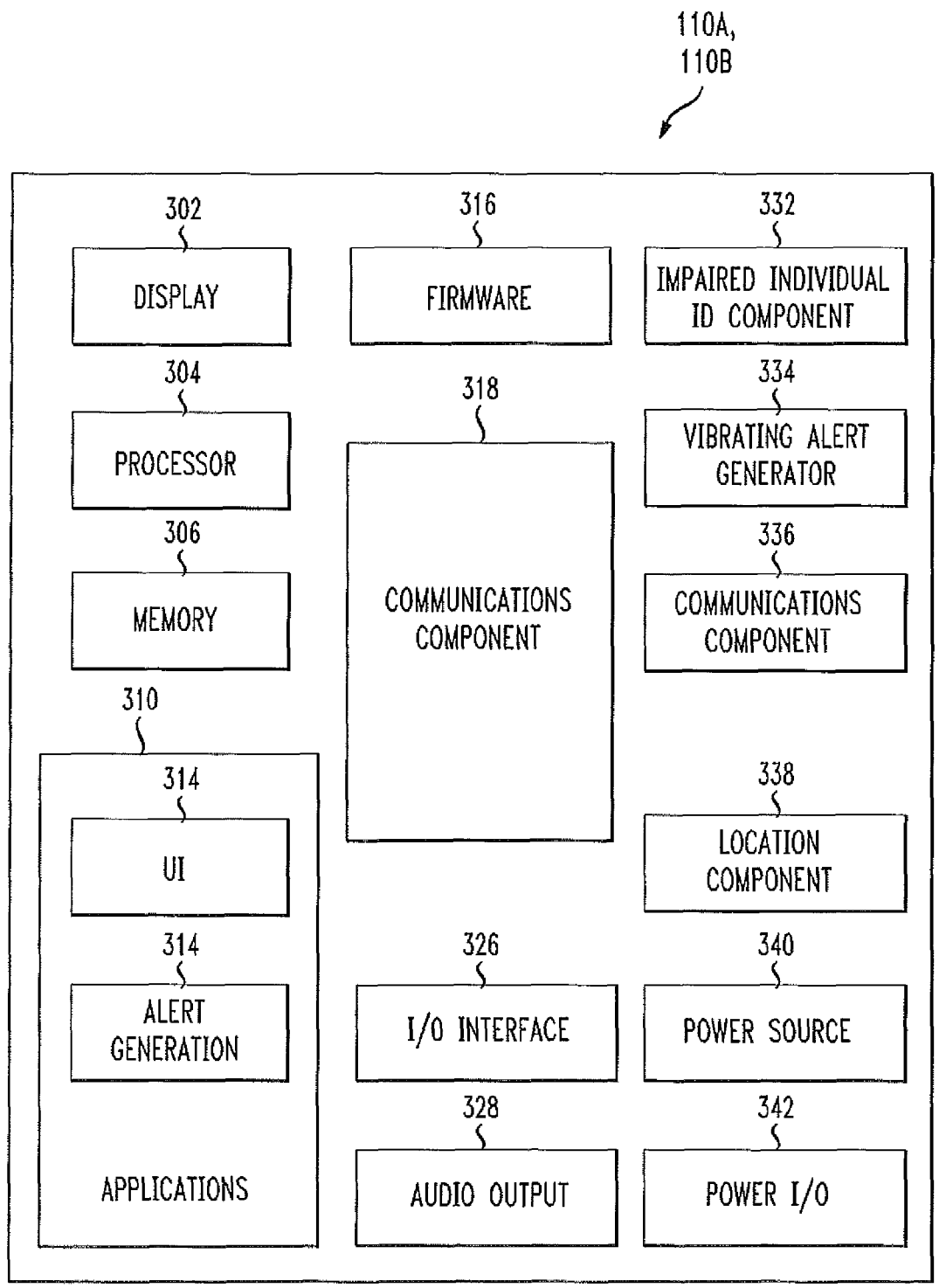
FIG. 3 illustrates a wireless device in detail according to an exemplary embodiment.

FIG. 3 illustrates a schematic block diagram of devices 110A, 110B for use in accordance with exemplary embodiments. Although connections between the components are not illustrated in FIG. 3, it should be understood that the components can interact with each other to carry out functions of the devices 110A, 110B.

It should be understood that FIG. 3 and the following description are intended to provide a brief, general description of a suitable environment in which the various aspects of some embodiments of the present disclosure can be implemented. While the description refers to computer-readable instructions, the present disclosure also can be implemented in combination with other program modules and/or as a combination of hardware and software in addition to, or in stead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Each of the devices 110A, 110B may be a standalone device or may be integrated in a wireless communication device, such as a cellular telephone or PDA. Each device may be carried, integrated into clothing or accessories, e.g., a medical bracelet, or integrated into a device used by the impaired individual, e.g., a cane or a wheelchair. The devices 110A, 110B can include a variety of computer-readable media, including volatile media, non-volatile media, removable media, and non-removable media. The term "computer-readable media" and variants thereof, as used in the description and claims, can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed and/or executed by the devices 110A, 110B.

The devices 110A, 110B can include a display 302 for displaying alert messages among other information. The devices 110A, 110B can include a processor 304 for controlling, executing, and/or processing data. A memory 306 can interface with the processor 302 and can store data. The data stored by the memory 306 can include computer-readable instructions for execution by the processor 302. The computer-readable instructions can include, for example, the applications 308.

The applications 308 can include, for example, a user interface application 310 and an alert generation application 312. The user interface application 310 may be used for receiving input from a user, e.g., a password or an instruction to turn the device on. The alert generation application 314 may be used to cause generation of a visual, audio, or tactile alert responsive to a signal from the traffic controllers 120A, 120B. The applications 308 can be stored in the memory 306 and/or in a firmware 316 as executable instructions, and can be executed by the processor 304. The firmware 316 also can store code for execution during initialization of the device 110A, 110B.

The devices 110A, 110B also can include an input/output (I/O) interface 326 for input/output of data and/or signals. The I/O interface 316 can be, e.g., an antenna or other suitable type of transceiver through which data and signals may be transmitted and received. It should be appreciated that the I/O interface 326 can be used for communications between the device 110A, 110B and the traffic light controllers 120A, 120B as well as the sensors 130A, 130B.

The devices 110A, 110B can include a vibrating alert generator 334 for providing a vibration alert function.

The devices 110A, 110B can include a communications component 336. The communications component 336 can interface with the processor 304 to facilitate wired/wireless communications with external devices, such as the traffic light controllers 120A, 120B and sensors 130A, 130B. The communications component 336 can be connected to the I/O interface 326, or the I/O interface 326 may be integrated with the communications component.

The communications component 336 also can facilitate communications reception from terrestrial radio networks, digital satellite radio networks, Internet-based radio services networks, combinations thereof, and the like. The communications component 336 can process data from a network such as, a GPS network.

Audio capabilities can be provided by an audio component 328 that can include, but is not limited to, speakers to output audio signals, and I/O ports such as, for example, headphones to output audio signals. The audio component 328 can include more than one speaker, including, for example, an earpiece speaker, a loudspeaker, a ringer, and the like.

The devices 110A, 110B can include an impaired individual identity system 332 for storing information verifying that the user of the device is an impaired individual. The impaired individual identity system may include a user interface which an impaired individual may use to enable the device. Also, or alternatively, the impaired individual identity system may be connected to the processor 304 and the I/O interface 326 (and/or communications component 336) for outputting signals verifying the identity of the impaired individual.

A location component 338 can be included to send and/or receive signals for use in determining location. As such, the location component 338 can receive, for example, GPS data, A-GPS data, data transmitted via WIFI®, data transmitted via WIMAX®, cellular network triangulation data, short range beacon signals, and/or combinations thereof, and the like. The location component 338 can receive and/or transmit signals via one or more antennae. The location component 338 can interface with components of a location network, such as a GPS network or a radio network. The devices 110A, 100B can obtain, generate, and/or receive data to identify its location, or can transmit data used by other devices (e.g., the traffic light controllers 120A, 120B and/or the sensors 130A, 130B to determine the locations of the devices 110A, 110B. The devices 110A, 110B can each include a power source 340, such as batteries and/or other power, and a power I/O component 342 for receiving power.

Although not illustrated in the interest of brevity, it should be appreciated that components such as those shown and described with regard to FIG. 3 may be included in an alarm generator 140A, 140B adjacent to the crosswalk. In particular, such a device may include a memory storing applications for generating audio and video alerts, a display, an audio component, firmware, a communications component, and I/O interface, a processor for executing the applications, and a power component similar to those depicted in FIG. 3.

Figure 4:
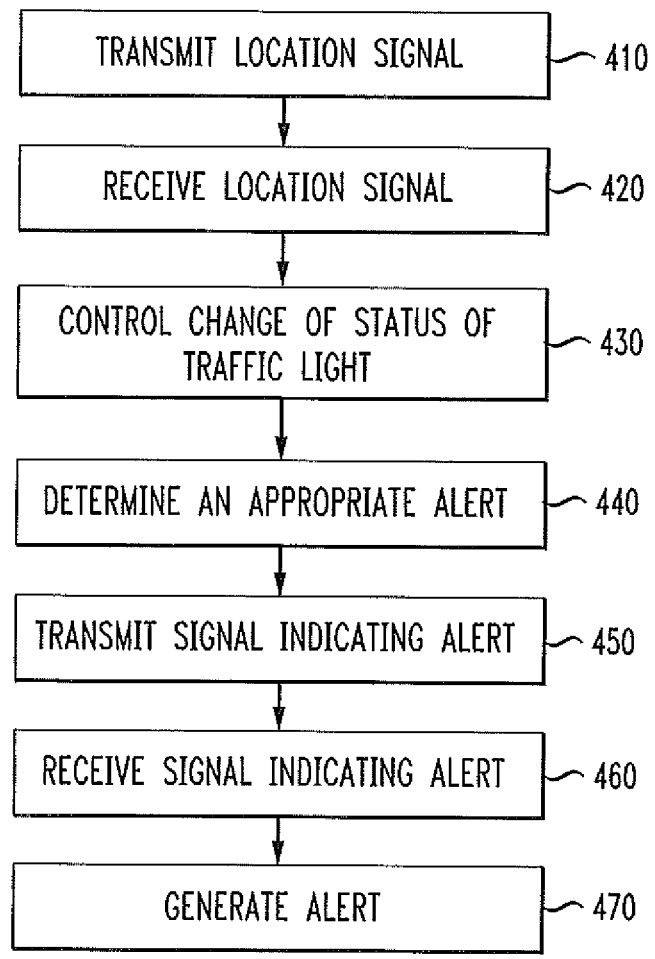
FIG. 4 illustrates an exemplary traffic light control process according to an exemplary embodiment.

FIG. 4 illustrates a process for controlling change of a traffic light according to an exemplary embodiment. A signal indicating a location of an impaired individual with respect to a crosswalk is transmitted by, e.g., devices 110A, 110B at step 410. The signal is detected or received by, e.g., traffic light controllers 120A, 120B at step 420. Although not shown as a separate step, it should be appreciated that the signal may also or instead be detected by sensors 130A, 130B distinct from the traffic light controllers 120a, 120b and subsequently reported to the traffic light controllers 120A, 120B. At step 430, the traffic light controllers 120A, 120B control a change of status of the traffic light based on the location of the impaired individual and, optionally, based on the type of impairment. At step 440, the traffic light controllers 120A, 120B determine an appropriate alert to provide to the impaired individual based on the location of the impaired individual and, optionally, the type of impairment. At step 450, a signal indicating the type of alert is transmitted, e.g., from the traffic light controllers 120A, 120B to the devices 110A, 110B and/or to the alert indicators 140A, 140B. The signal indicating the alert is received by one or more devices 110A, 110B and/or alert indicators 140A, 140B at step 460.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A computer readable storage device having instructions stored thereon which, when executed by a processor, cause the processor to perform operations comprising:
   controlling change of a status of a traffic light based on a received signal indicating a location of an impaired individual with respect to a crosswalk;
   determining an appropriate alert indicating the status of the traffic light based on the location of the impaired individual with respect to the crosswalk; and
   transmitting a signal indicating the appropriate alert.

2. The computer readable storage device of claim 1, wherein the received signal further indicates a type of impairment of the impaired individual.

3. The computer readable storage device of claim 2, wherein the instructions, when executed by the processor, further cause the processor to control the change of the status of the traffic light, and determine the appropriate alert based on the type of impairment of the impaired individual.

4. The computer readable storage device of claim 3, wherein if the impairment is a visual impairment, the appropriate alert is determined to include at least one of an audible alert and a tactile alert.

5. The computer readable storage device of claim 3, wherein if the impairment is a physical mobility handicap, the appropriate alert is determined to include at least one of a visual alert, an audible alert, and a tactile.

6. The computer readable storage device of claim 3, wherein if the impairment is a hearing impairment, the appropriate alert is determined to include at least one of a visual alert and a tactile alert.

7. The computer readable storage device of claim 1, wherein the instructions, when executed by the processor, further cause the processor to control changing of the status of the traffic light based on a pace of the impaired individual in progressing through the crosswalk.

8. A computer readable storage device, having instructions stored thereon which, when executed by a processor, cause the processor to perform operations comprising:
   initiating transmission of a signal indicating a location of an impaired individual with respect to a crosswalk, wherein the transmitted signal is used to control a change of a status of a traffic light based on the location of the impaired individual; and generating an appropriate alert based on a received signal indicating the appropriate alert, wherein the appropriate alert indicates the status of the traffic light and is determined based on the location of the impaired individual with respect to the crosswalk.

9. The computer readable storage device of claim 8, wherein the transmitted signal further indicates a type of impairment of the impaired individual.

10. The computer readable storage device of claim 9, wherein the received signal indicates the appropriate alert determined for the type of impairment of the impaired individual.

11. The computer readable storage device of claim 10, wherein if the impairment is a visual impairment, the appropriate alert includes at least one of an audible alert and a tactile alert.

12. The computer readable storage device of claim 10, wherein if the impairment is a physical mobility handicap, the appropriate alert includes at least one of a visual alert, an audible alert, and a tactile alert.

13. The computer readable storage device of claim 10, wherein if the impairment is a hearing impairment, the appropriate alert includes at least one of a visual alert and a tactile alert.

14. A method, comprising:
  transmitting, by a transceiver, a signal indicating a location of an impaired individual with respect to a crosswalk, wherein the transmitted signal is used to control a change of a status of the traffic light based on the location of the impaired individual;
  receiving, by the transceiver, a signal indicating an appropriate alert indicating the status of the traffic light determined based on the location of the impaired individual with respect to the crosswalk; and
  generating, by a processor, the appropriate alert based on the received signal.

15. The method of claim 14, wherein the transmitted signal is received by at least one sensor in proximity to the crosswalk.

16. The method of claim 14, wherein the transmitted signal further indicates a type of impairment of the impaired individual.

17. The method of claim 16, wherein the received signal indicates the appropriate alert determined for the type of impairment of the impaired individual.

18. The method of claim 16, wherein if the impairment is a visual impairment, the appropriate alert includes at least one of an audible alert and a tactile alert.

19. The method of claim 16, wherein if the impairment is a physical mobility handicap, the appropriate alert includes at least one of a visual alert, an audible alert, and a tactile alert.

20. The method of claim 16, wherein if the impairment is a hearing impairment, the appropriate alert includes at least one of a visual alert and a tactile alert.

* * * * *